United States Patent
Sanaee et al.

[11] Patent Number: 5,976,644
[45] Date of Patent: Nov. 2, 1999

[54] PROCESS FOR TREATING BAMBOO AND ARTICLES MADE BY THE PROCESS

[75] Inventors: Baha-al Dean Sanaee, Richmond Hill; Babak Kashef, Newmarket, both of Canada

[73] Assignee: Amati Bambu Ltd., Markham, Canada

[21] Appl. No.: 08/874,508

[22] Filed: Jun. 13, 1997

[51] Int. Cl.$^6$ ............................... B32B 5/12; B32B 21/14
[52] U.S. Cl. ............................. 428/17; 144/333; 156/61; 428/106; 428/537.1
[58] Field of Search .................. 428/17, 537.1, 428/106; 144/333; 156/61

[56] References Cited

U.S. PATENT DOCUMENTS

| | | | |
|---|---|---|---|
| 2,234,188 | 3/1941 | Morgan et al. | 162/22 |
| 2,791,523 | 5/1957 | Schoen | 127/37 |
| 2,835,611 | 5/1958 | Snyder | 127/37 |
| 4,810,551 | 3/1989 | Chu | 428/537.1 X |
| 4,818,321 | 4/1989 | Shimizu et al. | 144/333 X |
| 4,857,145 | 8/1989 | Villavicencio | 162/19 |
| 4,968,549 | 11/1990 | Smimizu et al. | 428/537.1 X |
| 5,441,787 | 8/1995 | Fujii et al. | 428/106 X |
| 5,456,964 | 10/1995 | Tamura et al. | 428/537.1 X |
| 5,543,197 | 8/1996 | Plaehn | 428/537.1 X |
| 5,675,951 | 10/1997 | Gow | 428/537.1 X |
| 5,786,063 | 7/1998 | Shibusawa et al. | 428/107 |
| 5,882,745 | 3/1999 | Mi et al. | 428/17 X |

*Primary Examiner*—Henry F. Epstein
*Attorney, Agent, or Firm*—Bereskin & Parr

[57] ABSTRACT

A process to treat bamboo comprises splitting a bamboo shoot lengthwise into at least two separate bamboo lengths, and removing any internal membranes and external nodes from the bamboo lengths. The split bamboo lengths are treated to remove substantially all sugars present in said lengths, following which they are dried to a moisture content of less than about 3%. The bamboo lengths are then rehumidified to a predetermined moisture content of greater than about 3%. Then, optionally, a first plurality of the bamboo lengths suitable to form a core for a laminated bamboo article may be uniformly sized, and a second plurality of the bamboo lengths suitable to form an outer surface for a laminated bamboo article may be uniformly sized. A core may then be formed with a uniform first plurality of the lengths by laminating the first plurality of lengths together, and at least one outer surface layer may be formed with a uniform second plurality of the lengths by laminating the second plurality of lengths together. Finally, the outer surface layer may be laminated to the core so that the grain direction of the first plurality of lengths is substantially parallel to the grain direction of the second plurality of lengths.

30 Claims, 6 Drawing Sheets

PROCESS FOR TREATING BAMBOO AND ARTICLES MADE BY THE PROCESS

FIELD OF THE INVENTION

The present invention relates to a process of treating bamboo, and articles produced by the process. In one particular aspect, the invention relates to a process of making a laminated bamboo article for use as flooring, furniture, or any other article which could be similarly made from wood.

BACKGROUND TO THE INVENTION

It has long been desired to produce articles of manufacture from bamboo as an alternative to wood. Wood, particularly hard wood, although a renewable resource, typically takes between 20 and 80 years from the time it is planted until it is ready to be harvested. Further, harvesting of the world's old growth rain forests is a destruction of nature which takes many centuries to renew.

It is therefore desirable to develop an alternative to wood based products, which still have the advantages of wood products. These include being able to cut the products to size, staining or otherwise finishing, and being durable.

Bamboo is a grass product, and is one of the fastest growing plants in the world. A bamboo plant reaches maturity in approximately two to three years from the time it is planted. Further, bamboo is an extremely abundant plant in many of the world's regions, particularly in developing countries. As such it would be desirable to utilize bamboo as an alternative to hardwood. There have been many attempts to process bamboo so that it may be used as an alternative to hardwood in construction, flooring, and articles of furniture.

However, these attempts have been largely unsuccessful, for several reasons. Firstly, bamboo stalks are cylindrical in shape, and have a hollow core, which is undesirable. Secondly, bamboo has a high sugar content, which may lead to insect infestation, causing a deterioration in the integrity of the bamboo, and a short useful life. Additionally, there may be problems associated with discolouration of the bamboo over time, and cracking or warping of bamboo products when exposed to variations in temperature and humidity.

While there have been several attempts to produce articles of furniture, flooring, and other items from laminated strips of bamboo, these attempts have been largely unsuccessful in overcoming the above described problems. For example, U.S. Pat. No. 4,810,551 to Chu discloses a laminated bamboo board, having a number of longitudinal layers and a number of lateral layers. Each of the layers is formed separately by aligning bamboo strips in parallel relation and bonding together with an adhesive. Subsequently the longitudinal layers and the lateral layers are bonded together in overlapping relating, to form a laminated bamboo board.

U.S. Pat. Nos. 4,818,321 and 4,968,549 to Shimizu disclose a method of making a laminated material from annual ligno-cellulosic stalks. The stalks are cut open in the direction of the stalk's fibre. The stalks are then flattened with a roller press and arranged in parallel relation to form a number of sheets. The sheets are then bonded together with a resin and heat is applied.

U.S. Pat. No. 5,543,197 to Plaehn discloses a method of forming a laminated bamboo beam, which is prepared by splitting and drying the bamboo stalks, applying adhesive to the stalks and arranging randomly in parallel relation, and compressing the stalks under high pressure to form a laminated bamboo beam.

Despite each of the foregoing attempts, there is still a need to develop a laminated bamboo article which is useful to make furniture, flooring, and other products which could otherwise be made from wood. A laminated bamboo product is required which will not deteriorate due to insect infestation, will not crack when exposed to variations in humidity and temperature, and which may be worked with in a manner similar to hardwood.

SUMMARY OF THE INVENTION

In accordance with one aspect of the present invention there is provided a method of treating bamboo comprising the steps of:

(a) splitting a bamboo shoot of a predetermined size lengthwise into at least two separate bamboo lengths;

(b) removing any internal membranes and external nodes from the bamboo lengths;

(c) treating the bamboo lengths to remove substantially all sugars present in the bamboo lengths;

(d) drying the bamboo lengths to a moisture content of less than about 3%; and (e) rehumidifying the bamboo lengths to a predetermined moisture content of greater than about 3%.

In accordance with another aspect of the present invention, there is provided a method of making a laminated bamboo article comprising:

(a) splitting a bamboo shoot of a predetermined size lengthwise into at least two separate bamboo lengths;

(b) removing any internal membranes and external nodes from the bamboo lengths;

(c) treating the bamboo lenths to remove substantially all sugars present in the bamboo lengths;

(d) drying the bamboo lengths to a moisture content of less than about 3%;

(e) rehumidifying the bamboo lengths to a predetermined moisture content of greater than about 3%;

(f) uniformly sizing a first plurality of the bamboo lengths suitable to form a core for the laminated bamboo article;

(g) uniformly sizing a second plurality of the bamboo lengths suitable to form an outer surface for the laminated bamboo article;

(h) forming a core with a uniform first plurality of said lengths by laminating said first plurality of lengths together;

(i) forming at least one outer surface layer with a uniform second plurality of said lengths by laminating said second plurality of lengths together; and (j) laminating said at least one outer surface layer to said core so that the grain direction of said first plurality of said lengths is substantially parallel to said grain direction of said second plurality of lengths.

In still a further aspect of the present invention there is provided a method of making a bamboo board comprising the steps of:

(a) splitting a bamboo shoot lengthwise into at least two separate bamboo lengths;

(b) removing any internal membranes and external nodes from said bamboo lengths;

(c) treating said bamboo lengths to remove substantially all sugars present in said lengths;

(d) flattening at least one of said bamboo lengths;

(e) drying said at least one length to a moisture content of less than about 3%; and (f) rehumidifying said at least one length to a predetermined moisture content of greater than about 3%.

In accordance with preferred aspects of the invention, the step of treating the bamboo lengths to remove sugars comprises exposing the bamboo to pressurized steam, or immersing the bamboo lengths in an aqueous sodium hydroxide bath at a temperature of greater than about 30° C. for at least 30 minutes.

In accordance with another aspect of the invention, there is an article made from bamboo according to the above described processes.

The present invention provides a method of making a laminated bamboo article which is durable, in that it will not crack when exposed to normal environmental changes in humidity and temperature, will not discolour, is not prone to insect infestation, and may be worked with in the same manner as ordinary hardwood.

BRIEF DESCRIPTION OF THE DRAWINGS

These and other advantages of the present invention will be more fully and completely understood through a consideration of the following description taken together with the accompanying drawing of a preferred embodiment of the invention in which.

DETAILED DESCRIPTION OF THE PREFERRED EMBODIMENT

Figure 1:
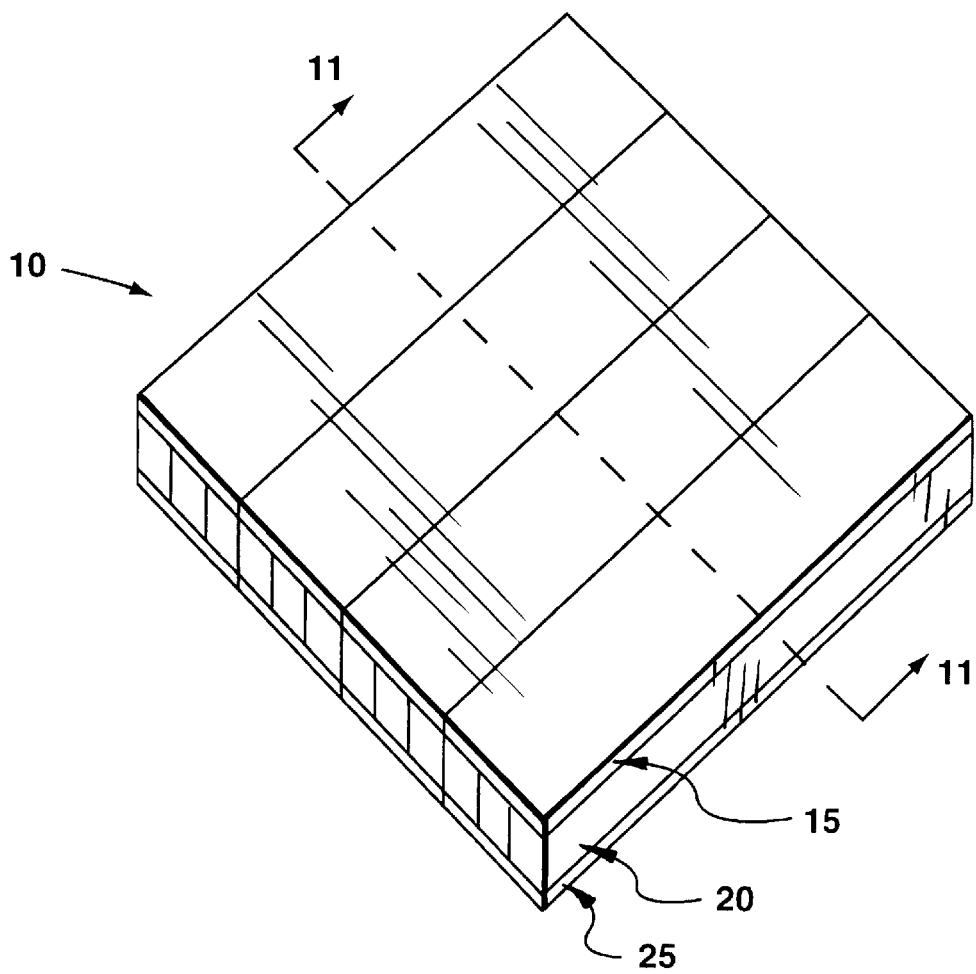
FIG. 1 is a perspective view of a laminated bamboo article made in accordance with a preferred aspect of the present invention.

Referring to FIG. 1, there is shown a bamboo article made in accordance with the process of the present invention, indicated generally as reference numeral 10. The article 10 is made from a plurality of layers 15, 20 and 25 of bamboo strips, which are laminated together.

Figure 2:
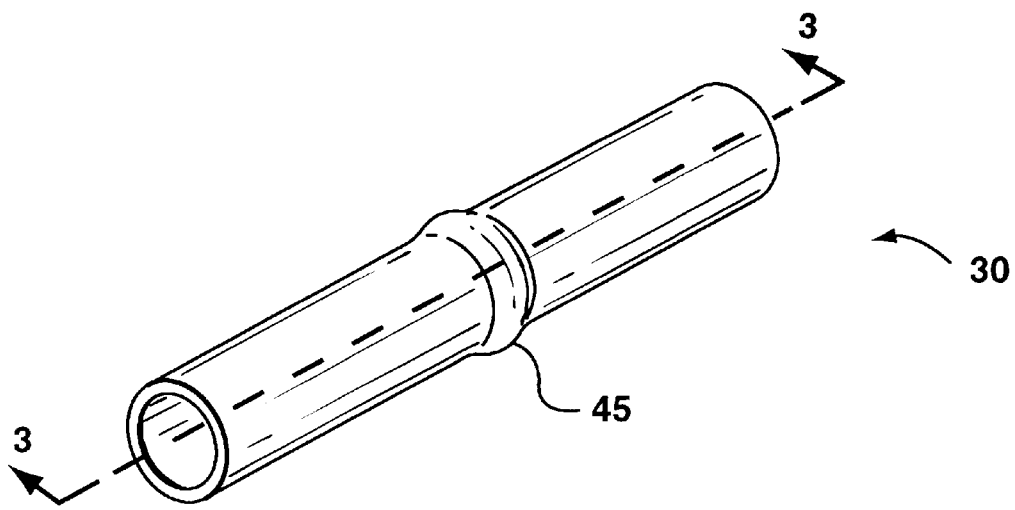
FIG. 2 is a perspective view of a segment of a typical raw bamboo shoot, used to make a laminated bamboo article according to the present invention.

According to the invention, in order to produce the laminated bamboo article 10, raw bamboo shoots of an appropriate size are selected. A typical raw bamboo shoot is shown in FIG. 2, as reference numeral 30. Any shoot which is larger than about three inches in diameter may be utilized. While there is no real upper limit to the diameter of the shoots which may be used, an effective upper limit is about twelve inches, which is about the largest diameter to which bamboo normally grows. The lower size limit for the diameter of the bamboo shoots is about three inches. If smaller shoots are used, then it is not possible to obtain bamboo strips (as will be subsequently discussed) which are thick enough to have adequate strength for most uses. Further, it is not possible to obtain strips which are wide enough to be practically useful. Depending upon the climate where the bamboo originates, the typical growth time for a bamboo shoot to reach between three and twelve inches in diameter is about two to three years. Generally, a bamboo shoot is selected based on the size of the thickness of the wall of the shoot, as will be subsequently discussed.

After one or more bamboo shoots have been selected, they are next cut into lengths of a manageable size, usually eight to ten feet in length, depending upon their size.

Figure 3:
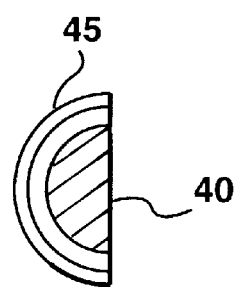
FIG. 3 is a cross-sectional view taken along the line 3—3 in FIG. 2.

After the bamboo has been cut into appropriate lengths, it is split lengthwise (in the same direction as the grain) as shown in FIG. 3. Depending upon the diameter of the bamboo, it is preferably cut into halves or quarters. FIG. 3 shows one half of a split bamboo shoot, although it will be appreciated that the shoots may be cut into more pieces, as will be discussed. Those bamboo shoots which are less than about four and one-half inches in diameter are preferably cut into halves, while those which are larger than about four and one-half inches in diameter are preferably cut into quarters. While the shoots may be split into halves or quarters (or any other number of pieces), it has been found that the above selection guidelines provide bamboo lengths which are wide enough to be practically useful.

Figure 4:
FIG. 4 is a cross-sectional view of the bamboo shoot shown in FIG. 2, taken along the line 3—3, with the nodes and internal membranes of the bamboo shoot removed.

Referring to FIGS. 2 and 3, after the lengths of bamboo are split open as described, the internal membranes 40 and nodes 45 are removed. Although not shown in FIG. 2, there is a membrane 40 (as seen in FIG. 3) extending across the interior of the bamboo shoot 30 at every node 45. These membranes and nodes may be removed in any desired manner, for example with an ordinary cutting edge such as a knife. Once the membranes and nodes are removed, the internal and external surfaces of the bamboo lengths are generally smooth, as shown in FIG. 4.

Once a number of bamboo lengths have been prepared as described above, the lengths are then "graded" into two broad categories. The "second grade" is for those bamboo lengths which have unacceptable imperfections on their outer surface such as cracks, holes or bumps. These "second grade" bamboo lengths are preferably used to make laminated bamboo articles. The "first grade" is for those bamboo lengths which are perfect or have acceptable imperfections on their outer surface. These "first grade" bamboo lengths are preferably used to make individual bamboo boards, or bamboo veneer, as will be discussed.

The bamboo lengths in the "first grade" (ie. those which are perfect or have acceptable imperfections on their outer surface) are then treated so that they may be pressed into flat bamboo boards. The split bamboo lengths are treated with pressurized steam, preferably in an autoclave, so that moisture and heat penetrates the cells of the bamboo. This penetration of heat and steam softens the bamboo so that it may subsequently be pressed flat into a board. This penetration of steam also removes the majority of residual sugars present in the bamboo, which aids in the prevention of insect infestation in the final product.

This "moisturizing" process is preferably conducted in an autoclave at a temperature of about between 115° C. and 140° C., and preferably the temperature of the autoclave is about 121° C. The pressure of the autoclave is between about 15 psi and about 20 psi, and is preferably about 18 psi. The bamboo is exposed to the pressurized steam in the autoclave for between about 1.9 minutes and about 5 minutes, and preferably is exposed for about 2 minutes. While it is possible to expose the bamboo to the pressurized steam for more than 5 minutes it is unnecessary to do so. The important factor is that the bamboo is exposed to the steam at a temperature and pressure, for a time sufficient for moisture and heat to sufficiently penetrate the fibre and cells of the bamboo, to make it susceptible to flattening when compressed under pressure. Additionally, it is important that the majority of residual sugar present in the bamboo is removed.

Figure 5:
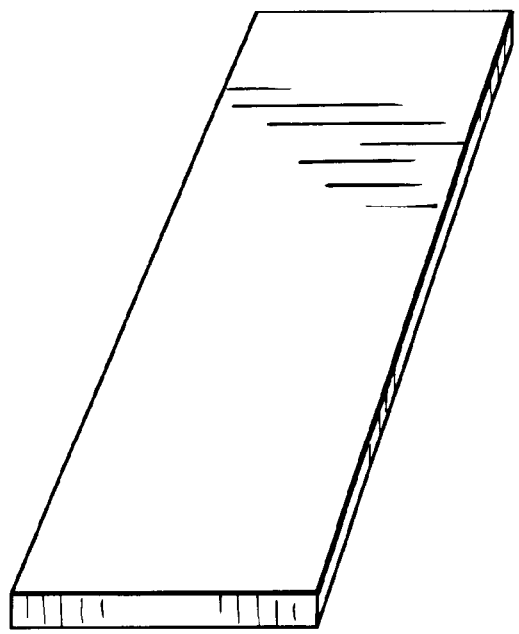
FIG. 5 is a perspective view of a bamboo board made in accordance with one aspect of the present invention.

Once the "first grade" bamboo has been subjected to the pressurized steam, it is next flattened under pressure to form a bamboo board as shown in FIG. 5. The bamboo may be flattened by any known means, for example by a stamping type press or a roller type press. It has been found that use of a "stamp press" is desirable over a roller type press, because it reduces the amount which the bamboo cracks during the flattening process (compared with a roller type press). During this flattening process, the bamboo is exposed to a pressure between about 1400 psi and about 1600 psi, and is preferably exposed to a pressure of about 1500 psi, for a period of between about 30 seconds and about 40 seconds, and preferably for about 35 seconds.

The benefit of this process will be appreciated in that by flattening a bamboo shoot, a wider bamboo board may be obtained, when compared with cutting individual boards from a hollow cylindrical bamboo shoot.

Once the "first grade" bamboo lengths are flattened, they are again sorted into two different "sub-grades". The "first subgrade" includes those bamboo lengths which still are perfect or contain acceptable imperfections after the flattening process, and the "second subgrade" includes those bamboo lengths which develop cracks, bumps, holes or other unacceptable imperfections during the flattening process. The "first subgrade" bamboo is preferably used to make individual bamboo boards, while the "second grade" bamboo is preferably used to make veneer (both of which will be subsequently discussed).

The "second grade" bamboo lengths with imperfections are also treated to remove their sugar content, but are preferably done so in a manner different from the steam treatment previously described. While the steam treatment may also be used for this "second grade" of raw bamboo, it is undesirable since the cost of the steam treatment is considerably higher. Instead, the lengths of split bamboo from the "second grade" are chemically treated in an aqueous bath of sodium hydroxide at an elevated temperature. The bath in which the bamboo lengths are immersed has a concentration of from about 10 ml to about 50 ml of sodium hydroxide per litre of water in the bath. If a concentration of more than about 50 ml per liter of water is used, then the bath tends to erode or "eat away" at the bamboo, causing deterioration and yellowing of the bamboo. If the concentration of sodium hydroxide is less than about 10 ml per liter of water, then the sugar content of the bamboo is not sufficiently reduced so as to later avoid insect infestation in the final product. Preferably, the concentration of the bath is about 35 ml per liter of water, The bamboo lengths are exposed to the sodium hydroxide bath for a sufficient time until the sugar content of the bamboo is reduced to an acceptable level, generally for a period of not less than about 30 minutes, and preferably for a period of about eight to twelve hours. The temperature of the bath is greater than about 25° C., and preferably is about 30° C. Generally, the maximum temperature of the bath is about 40° C.

These "second grade" bamboo lengths are next thoroughly rinsed with plain water, to remove all sodium hydroxide which may be present in the bamboo. The rinsing process may take place at room temperature.

All of the bamboo lengths (both "first" and "second" grades) which have been treated (either through pressurized steam or exposure to the sodium hydroxide bath), are next kiln dried. The bamboo lengths are placed in a kiln dryer at a temperature of between about 50° C. and about 75° C., for a period of time sufficient to reduce the moisture content in the bamboo to less than about 3%, preferably to less than about 2% and most preferably to less than about 0.5%. While the temperature of the kiln may be between about 50° C. and about 75° C., it is preferably between about 50° C. and about 60° C., and most preferably the temperature of the kiln is about 50° C. If a higher temperature is used, the bamboo may dry too quickly and undesirably warp or crack. If a lower temperature is used, the bamboo will take too long a period of time to dry, which is commercially undesirable. At the preferred temperature, the bamboo is typically left in the kiln for about one week to reach the desired moisture content.

Once the level of moisture is reduced to less than 3%, the bamboo is remoisturized in the kiln by exposing it to humidity until it reaches a predetermined level of moisture content. For use in temperate climates such as North America, it has been determined that the bamboo is preferably rehumidified to a moisture content of between about 7% to 8%. If the bamboo is rehumidified to a moisture content of less than about 7% to 8%, then the bamboo may tend to crack due to shrinkage because of temperature and humidity variations in the climate. If the bamboo has a moisture content of greater than about 7% to 8%, then the bamboo may tend to warp and buckle when exposed to variations in temperature and humidity. If the bamboo is intended to be used in tropical climates, it is preferably rehumidified to a moisture content of between about 10% and about 12%, because of the naturally higher humidity and temperature. Accordingly, it will be appreciated that the exact moisture content to which the bamboo is rehumidified will depend upon the climate in which the bamboo is to be used. The rehumidification process in the kiln takes a few hours, usually about four to six hours.

Once the bamboo has been moisturized to the correct humidity, the lengths of bamboo may be worked with in the same manner as ordinary hard wood. The bamboo lengths may be planed, cut, sanded and finished as any piece of hard wood.

The "first subgrade" of the "first grade" bamboo (ie. that which was successfully flattened with little to no imperfections) is preferably used to make articles of construction in which the individual bamboo boards may be joined together as any wood boards. For example these boards may be used to make furniture, etc., by nailing, screwing or gluing the boards together.

Additionally, the "second subgrade" of the "first grade" bamboo (ie. those of the "first grade" which developed imperfections during the flattening process) are particularly suitable for use as a veneer finish. These members are sliced into pieces of a thickness which is suitable for use as a veneer. Generally, the minimum thickness of the bamboo which is acceptable to work with is about one-thirtysecond of an inch. As will be appreciated, the thinner the thickness of bamboo for use as veneer, the more veneer may be made. Therefore, the veneer is preferably about one-thirtysecond of an inch in thickness. These veneer members are then ready to be jointed and spliced as any other wood veneer, which techniques are well known in the art. The veneer may be used in a manner similar to any wood veneer.

For larger articles to be made, individual bamboo members are laminated together, according to the following process.

The bamboo lengths in the "second grade" (ie. those bamboo lengths which are imperfect) are divided into two subcategories defined by the wall thickness of the bamboo. The first subcategory preferably contains those bamboo lengths which have a wall thickness of between about one-eighth inch and about one-half inch, and the second subcategory contains those lengths which have a wall thickness of greater than about one-half inch. It has been found that bamboo lengths which have a wall thickness of less that one-eighth of an inch are generally not suitable for use, because they lack the required strength.

The "first subcategory" (those with a wall thickness of between about one-eighth and about one-quarter of an inch) are next cut to a desired size and planed, so that all members are of a uniform size and shape. These bamboo pieces are to be used as the "core" of a finished laminated bamboo article. The preferred minimum size of bamboo which is acceptable for use as the core is about one-half inch by about one-quarter inch, and the preferred maximum size is about one-half inch by one-half inch. While larger pieces may be used for the core, it is generally desirable to use larger pieces for other purposes, for example, as individual pieces which may be worked with to form articles, without lamination.

Figure 7:
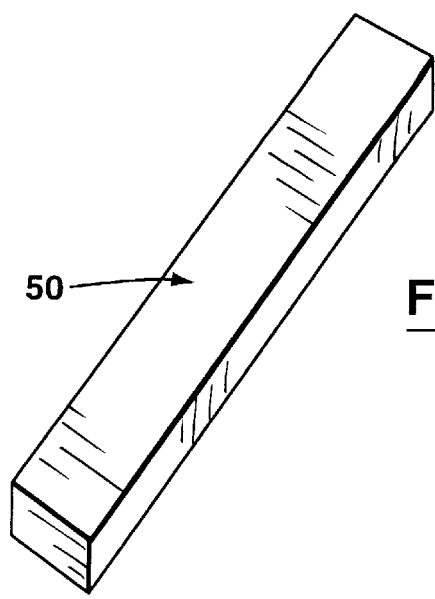
FIG. 7 is a perspective view of a processed bamboo length used to form a core in the laminated bamboo article shown in FIG. 1.
Figure 6:
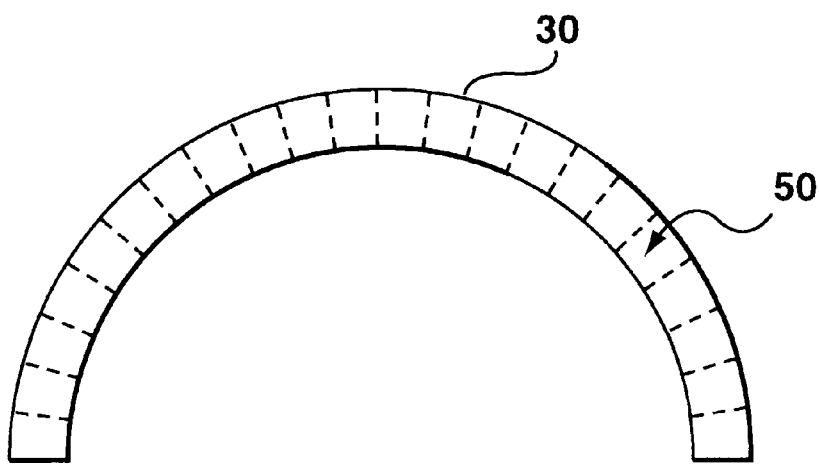
FIG. 6 is an enlarged cross-sectional view of the bamboo shoot shown in FIG. 4 with the nodes and membranes of the bamboo shoot removed showing a manner of sizing the bamboo in dotted outline.

Although the individual "core" members 50 may be cut from the "second grade" bamboo lengths in any desired manner, the preferred manner is shown in FIG. 6. This manner of cutting gives the largest number of "core" members of the desired size. After cutting, the edges of the core members are squared. An individual core member 50 is shown in FIG. 7 (after being sized and squared).

Figure 8:
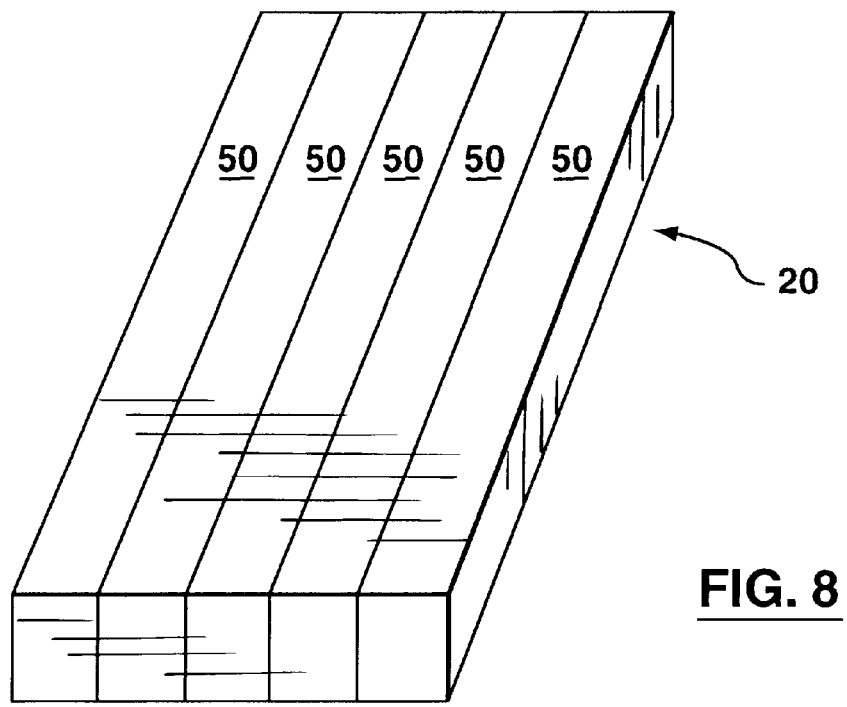
FIG. 8 is a perspective view of the core portion of the laminated bamboo article shown in FIG. 1.

The sized "core" members 50 are then "edge glued" together, preferably in a high frequency press (although any suitable method can be used), and preferably in an orientation so that the larger sides of the bamboo members (if not square) are in contact with one another. This orientation may be seen in FIG. 8. This process forms a laminated core 20 for the article which is to be produced. This orientation provides better strength for the core than if the smaller sides are in contact with each other. Although the type of glue which is used is not critical, preferably, the glue is a hot melt glue which is non-toxic and "environmentally friendly", such as a vinegar based glue. The core members 50 are laminated together under a pressure of between about 300 psi and about 350 psi, and preferably at a pressure of about 325 psi. If too much pressure is used, the core members 50 will crack, while if too little pressure is used, then the core members may not stick together.

Figure 10:
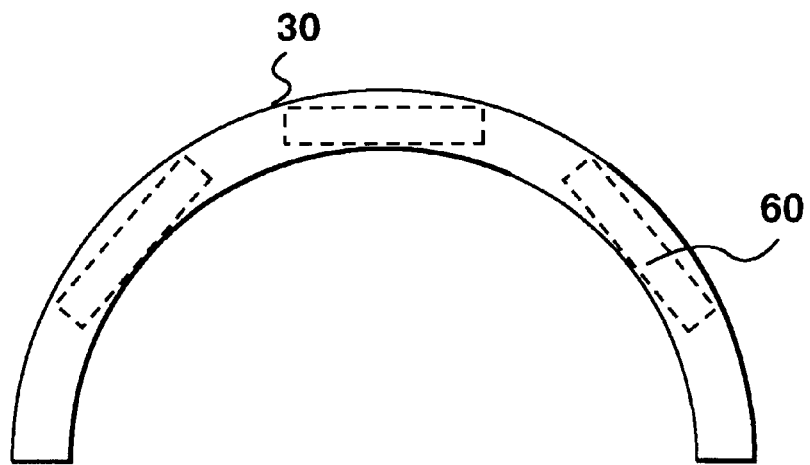
FIG. 10 is an enlarged cross-sectional view of the bamboo shown in FIG. 4 with the nodes and membranes of the bamboo shoot removed, showing a different manner of sizing the bamboo in dotted outline.
Figure 9:
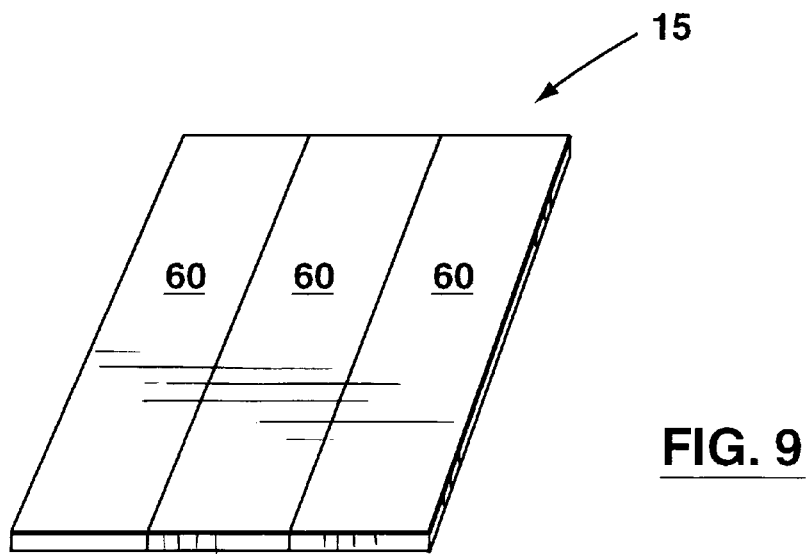
FIG. 9 is a perspective view of an outer surface portion of the laminated bamboo article shown in FIG. 1.
Figure 11:
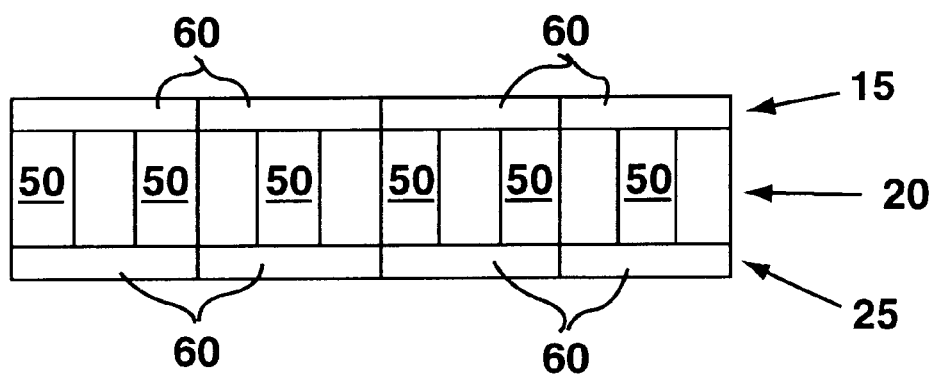
FIG. 11 is a cross-sectional view of the laminated bamboo article shown in FIG. 1, taken along the line 11—11.

To the "core" 20, there is added at least one outer surface layer of bamboo 15 (FIGS. 1 and 9). In cases where there will be two outer surfaces of the laminated bamboo article visible, it is generally desirable to provide two outer surface layers 15, 25 (FIG. 1). The outer surface layers are made from the larger pieces of bamboo (ie. from the "second grade" bamboo with a wall thickness of greater than about one-half of an inch), and are preferably cut to approximately one-eighth of an inch in thickness, although this can vary. The minimum thickness of the outer surface layers 15, 25 generally acceptable is about one-sixteenth of an inch. Also preferably, the outer surface layer pieces 60 are cut to their maximum width, which is preferably between about three-quarters of an inch and about one and one-half inches in thickness. The preferred manner of cutting these members is shown in FIG. 10. This manner of cutting is preferred because the bamboo can have the maximum width for a given thickness. After being cut to size, the top and bottom layer pieces are squared and planed so as to be uniform, as shown in FIG. 9.

The outer surface layer pieces are next edge glued together in a high frequency glue press, with their orientation so that the smaller sides of the pieces are glued together, which can also be seen in FIG. 9. The details of the gluing process and the type of glue which may be used are the same as those previously described for the core.

Next, at least one of the outer surface layers 15, 25 are laminated to the core 20. This is also accomplished by use of a high frequency glue press in a manner similar to the process described to form the core. Preferably, the direction of the grain of the outer surface layer members 15, 25 runs in a direction generally parallel to the direction of the grain of the core members 20. It has been found that this orientation provides an improved strength for the end product.

Although generally it will be desirable to have an outer surface layer on both sides of the core, it will be appreciated that if the end product is to be used for flooring, or some other application in which only one surface of the bamboo product will be visible, then it is only necessary to have one outer surface layer laminated.

The board formed by the above described process may now be cut, sanded, finished, stained, or worked with in any manner in which ordinary wood could be worked with.

It will be appreciated that various changes and modifications may be made within the spirit of the invention, and all such changes are included within the scope of the attached claims.

What is claimed is:

1. A process for treating bamboo, comprising:
    (a) splitting a bamboo shoot lengthwise into at least two separate bamboo lengths;
    (b) removing any internal membranes and external nodes from said bamboo lengths;
    (c) removing substantially all sugars present in said lengths;
    (d) drying said lengths to a moisture content of less than about 3%; and
    (e) rehumidifying said lengths to a predetermined moisture content of greater than about 3%.

2. The process as claimed in claim 1 wherein said step of removing sugar comprises exposing the bamboo lengths to steam under pressure for a period of time sufficient to remove substantially all sugars present in the bamboo.

3. The process as claimed in claim 2 wherein the temperature of the steam is between about 115° C. and about 140° C. and the pressure of the steam is between about 15 psi and about 20 psi.

4. The process as claimed in claim 3 wherein the temperature of the steam is about 121° C. and the pressure of the steam is about 18 psi, and the bamboo is exposed for a period of between about 2 minutes and 5 minutes.

5. The process as claimed in claim 1 wherein said step of removing sugar comprises immersing the bamboo lengths in an aqueous sodium hydroxide bath of a concentration, temperature and period of time sufficient to remove substantially all sugars present in the bamboo.

6. The process as claimed in claim 5 wherein the sodium hydroxide bath has a concentration of between about 10 ml and about 50 ml per liter of water, and a temperature of above 30° C., and the bamboo is immersed in the bath for a period of at least about 30 minutes.

7. The process as claimed in claim 6 wherein the sodium hydroxide bath has a concentration of about 35 ml per liter of water, a temperature of about 30° C. and the bamboo is immersed in the bath for about eight to twelve hours.

8. The process as claimed in claim 7 wherein said step of removing sugar further comprises rinsing the bamboo with water after immersion in the sodium hydroxide bath.

9. The process as claimed in claim 1 wherein said drying step comprises drying said lengths to a moisture content of less than about 1%.

10. The process as claimed in claim 9 wherein said drying step comprises drying said lengths to a moisture content of less than about 0.5%.

11. The process as claimed in claim 1 wherein said rehumidifying step comprises rehumidifying the bamboo to a moisture content of between about 7% and about 8% when the laminated bamboo product is to be used in temperate climates.

12. The process as claimed in claim 1 wherein said rehumidifying step comprises rehumidifying the bamboo to a moisture content of between about 11% and about 12% when the laminated bamboo product is to be used in tropical climates.

13. The process as claimed in claim 1 additionally comprising, after the rehumidification step, the steps of:
  (a) uniformly sizing a first plurality of the bamboo lengths suitable to form a core for a laminated bamboo article;
  (b) uniformly sizing a second plurality of the bamboo lengths suitable to form an outer surface for a laminated bamboo article;
  (c) forming a core with a uniform first plurality of said lengths by laminating said first plurality of lengths together;
  (d) forming at least one outer surface layer with a uniform second plurality of said lengths by laminating said second plurality of lengths together; and
  (e) laminating said at least one outer surface layer to said core so that the grain direction of said first plurality of said lengths is substantially parallel to said grain direction of said second plurality of lengths.

14. The process as claimed in claim 13 wherein said core forming step comprises laminating together a plurality of said first lengths together, said first lengths having a first set of opposing sides and a second set of opposing sides, said first set of sides having a larger width than said second set of sides, and said first set of sides being joined to the first set of sides of adjacent first lengths.

15. The process as claimed in claim 13 wherein said outer surface forming step comprises laminating together a plurality of said second lengths, said second lengths having a first set of opposing sides and a second set of opposing sides, said first set of opposing sides having a smaller width than said second sides, said first set of sides being joined to the first set of sides of adjacent second lengths.

16. The process as claimed in claim 13 wherein said plurality of first lengths are uniformly squared to a dimension of between about ¼"×¼" and about ½"×½" prior to laminating to form said core.

17. The process as claimed in claim 13 wherein said plurality of second lengths are uniformly squared to a dimension of between about ⅛"×¾" and about ¼"×1½" prior to laminating to form said at least one outer surface layer.

18. The process as claimed in claim 13 wherein said plurality of first lengths are obtained from a bamboo shoot having a wall thickness of between about ⅛" and about ½".

19. The process as claimed in claim 13 wherein said plurality of second lengths are obtained from a bamboo shoot having a wall thickness of larger than about ½".

20. The process as claimed in claim 13 additionally comprising forming a second outer surface layer with said second plurality of lengths by laminating said lengths together and laminating said second outer surface layer to said core so that the grain direction of said first plurality of lengths is substantially parallel to said grain direction of said second plurality of lengths.

21. A laminated bamboo article made by the process as claimed in claim 13.

22. A process for making a bamboo board comprising the steps of:
  (a) selecting a bamboo shoot of a predetermined size;
  (b) splitting the bamboo shoot lengthwise into at least two separate bamboo lengths;
  (c) removing any internal membranes and external nodes from at least one of said bamboo lengths;
  (d) removing substantially all sugars present in at least one of said lengths;
  (e) flattening at least said one of said bamboo lengths;
  (f) drying said at least one of said lengths to a moisture content of less than about 3%; and
  (g) rehumidifying said at least one of said lengths to a predetermined moisture content of greater than about 3%.

23. The process as claimed in claim 22 wherein said step of removing sugar comprises exposing said at least one of said bamboo lengths to pressurized steam for a period sufficient to remove substantially all sugars present in said length.

24. The process as claimed in claim 22 wherein said at least one of said lengths is exposed to steam at a pressure of between about 15 psi and about 20 psi, and a temperature of between about 115° C. and about 140° C., and for a period of between about 2 minutes and about 5 minutes.

25. The process as claimed in claim 24 wherein said at least one of said lengths is exposed to steam at a pressure of about 18 psi and at temperatures of about 121° C., for a period of about 2 minutes.

26. The process as claimed in claim 22 wherein said rehumidifying step comprises rehumidifying said at least one of said bamboo lengths to a moisture content of between about 7% and about 8% when the bamboo board is to be used in temperate climates.

27. The process as claimed in claim 22 wherein said rehumidifying step comprises rehumidifying said at least one of said bamboo lengths to a moisture content of between about 11% and about 12% when the bamboo board is to be used in tropical climates.

28. The process as claimed in claim 22 wherein said drying step comprises drying said at least one of said bamboo lengths to a moisture content of less than about 1%.

29. The process as claimed in claim 22 wherein said drying step comprises drying said at least one of said bamboo lengths to a moisture content of less than about 0.5%.

30. A bamboo board made by the process as claimed in claim 22.

* * * * *